US011288193B2

(12) United States Patent
Buchanan et al.

(10) Patent No.: US 11,288,193 B2
(45) Date of Patent: Mar. 29, 2022

(54) FLEXIBLE, NON-BLOCKING ASYNCHRONOUS TRANSFER OF TIME-VARIANT ATOMIC DATA

(71) Applicant: Cirrus Logic International Semiconductor Ltd., Edinburgh (GB)

(72) Inventors: Nathan Daniel Pozniak Buchanan, Austin, TX (US); Nariankadu D. Hemkumar, Austin, TX (US); Sachin Deo, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 313 days.

(21) Appl. No.: 16/404,323

(22) Filed: May 6, 2019

(65) Prior Publication Data

US 2020/0356477 A1    Nov. 12, 2020

(51) Int. Cl.
*G06F 12/0806* (2016.01)
*H04N 5/232* (2006.01)
*G06F 9/54* (2006.01)

(52) U.S. Cl.
CPC ..... *G06F 12/0806* (2013.01); *H04N 5/23203* (2013.01); *G06F 2212/608* (2013.01)

(58) Field of Classification Search
CPC .......... G06F 12/0806; G06F 2212/608; H04N 5/23203
See application file for complete search history.

(56) References Cited

U.S. PATENT DOCUMENTS 5,179,665 A * 1/1993 Roslund ................ G06F 15/167
709/213

2005/0186946 A1 * 8/2005 Takahashi .............. H04N 7/185
455/413

(Continued)

FOREIGN PATENT DOCUMENTS

EP          0551242 A2    7/1993
WO     2006058051 A2    6/2006

OTHER PUBLICATIONS

International Search Report and Written Opinion of the International Searching Authority, International Application No. PCT/US2020/031079, dated Aug. 20, 2020.

*Primary Examiner* — Getente A Yimer
(74) *Attorney, Agent, or Firm* — Jackson Walker L.L.P.

(57) ABSTRACT

A system for atomically transferring vectors of data from a transmitter of the vectors of data to a receiver of the vectors of data may include a plurality of memory buffers configured to store the vectors of the data, each buffer configured to store one vector of the vectors of data at a time, the plurality of memory buffers comprising at least three memory buffers and a controller for controlling the plurality of memory buffers. The controller may be configured to, responsive to a condition for transferring information represented by the vectors of data to the receiver, determine which of the plurality of buffers from which the receiver may receive most-recently updated information completely written to the plurality of buffers by the transmitter. The controller may further be configured to, responsive to a condition for updating information represented by the vectors of data, determine which of the plurality of buffers for the transmitter to write updated information without blocking atomic receipt by the receiver of information from a most-recently updated buffer.

20 Claims, 2 Drawing Sheets

(56) References Cited

U.S. PATENT DOCUMENTS

2006/0212662 A1* 9/2006 Ueda .................... G06F 13/385
　　　　　　　　　　　　　　　　　　　　　711/147
2008/0060042 A1* 3/2008 Fung ................... H04N 21/443
　　　　　　　　　　　　　　　　　　　　　725/134

* cited by examiner

FLEXIBLE, NON-BLOCKING ASYNCHRONOUS TRANSFER OF TIME-VARIANT ATOMIC DATA

FIELD OF DISCLOSURE

The present disclosure relates in general to electronic devices, and more particularly, flexible, non-blocking asynchronous transfer of time-variant atomic data, as may be used in a system for controlling a position of a camera in a mobile device, and/or other suitable applications.

BACKGROUND

Many traditional mobile devices (e.g., mobile phones) include one or more cameras for capturing images. To provide for image stabilization and focus, a position of a camera within a plane substantially parallel to a subject of an image as well as a position of a lens of the camera in a direction perpendicular to such plane, may be controlled by a plurality of motors under the control of a camera controller. A control system may be implemented using an applications processor of the mobile device coupled via a communication interface (e.g., an Inter-Integrated Circuit or I2C interface) to a camera controller local to the camera and its various motors. For example, the applications processor may communicate to the camera controller a vector of data regarding a target position for an applications processor, whereas the camera controller may communicate to the applications processor a vector regarding an actual position of the camera, as sensed by a plurality of magnetic sensors (e.g., Hall sensors) and/or other appropriate sensors.

The transfer of vector data from the camera controller to the applications processor may be a transfer in which the data is asynchronously produced by the camera controller and asynchronously consumed by the applications processor. In addition, it may be desirable that the data vector consumed is the newest available vector. Further, it may be desirable that the production and consumption of the data vector be atomic, in that the data vector may not change during consumption in order to prevent data corruption, data miscommunication, and data misinterpretation. Moreover, it may be desirable for the transfer to be non-blocking, meaning that the camera controller must be able to produce a new data vector even when the applications processor is consuming an existing data vector. It may additionally be desirable that the transfer involve minimal communication overhead and have configurable vector length and content.

SUMMARY

In accordance with the teachings of the present disclosure, the disadvantages and problems associated with transfer of data vectors over a communication interface may be reduced or eliminated.

In accordance with embodiments of the present disclosure, a system for atomically transferring vectors of data from a transmitter of the vectors of data to a receiver of the vectors of data may include a plurality of memory buffers configured to store the vectors of the data, each buffer configured to store one vector of the vectors of data at a time, the plurality of memory buffers comprising at least three memory buffers and a controller for controlling the plurality of memory buffers. The controller may be configured to, responsive to a condition for transferring information represented by the vectors of data to the receiver, determine which of the plurality of buffers from which the receiver may receive most-recently updated information completely written to the plurality of buffers by the transmitter. The controller may further be configured to, responsive to a condition for updating information represented by the vectors of data, determine which of the plurality of buffers for the transmitter to write updated information without blocking atomic receipt by the receiver of information from a most-recently updated buffer.

In accordance with these and other embodiments of the present disclosure, a method for atomically transferring vectors of data from a transmitter of the vectors of data to a receiver of the vectors of data may include storing the vectors of data in a plurality of memory buffers, each buffer configured to store one vector of the vectors of data at a time, the plurality of memory buffers comprising at least three memory buffers. The method may also include, responsive to a condition for transferring information represented by the vectors of data to the receiver, determining which of the plurality of buffers from which the receiver may receive most-recently updated information completely written to the plurality of buffers by the transmitter. The method may further include responsive to a condition for updating information represented by the vectors of data, determining which of the plurality of buffers for the transmitter to write updated information without blocking atomic receipt by the receiver of information from a most-recently updated buffer.

In accordance with these and other embodiments of the present disclosure, a system may include a transmitter for transmitting of vectors of data, a receiver for receiving vectors of data, a plurality of memory buffers configured to store the vectors of the data, each buffer configured to store one vector of the vectors of data at a time, the plurality of memory buffers comprising at least three memory buffers, and a controller for controlling the plurality of memory buffers and atomically transferring vectors of data from a transmitter of the vectors of data to a receiver of the vectors of data, The controller may be configured to, responsive to a condition for transferring information represented by the vectors of data to the receiver, determine which of the plurality of buffers from which the receiver may receive most-recently updated information completely written to the plurality of buffers by the transmitter. The controller may further be configured to, responsive to a condition for updating information represented by the vectors of data, determine which of the plurality of buffers for the transmitter to write updated information without blocking atomic receipt by the receiver of information from a most-recently updated buffer.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

In accordance with embodiments of the present disclosure, a triple buffer scheme may enable efficient asynchronous and non-blocking transfer of configurable-length vector atomic time-variant data. Atomicity of transactions may be guaranteed by buffer pointers that may designate buffers in use and a procedure to determine a free buffer for storing a vector of data to be written by a transmitter of data.

Figure 1:
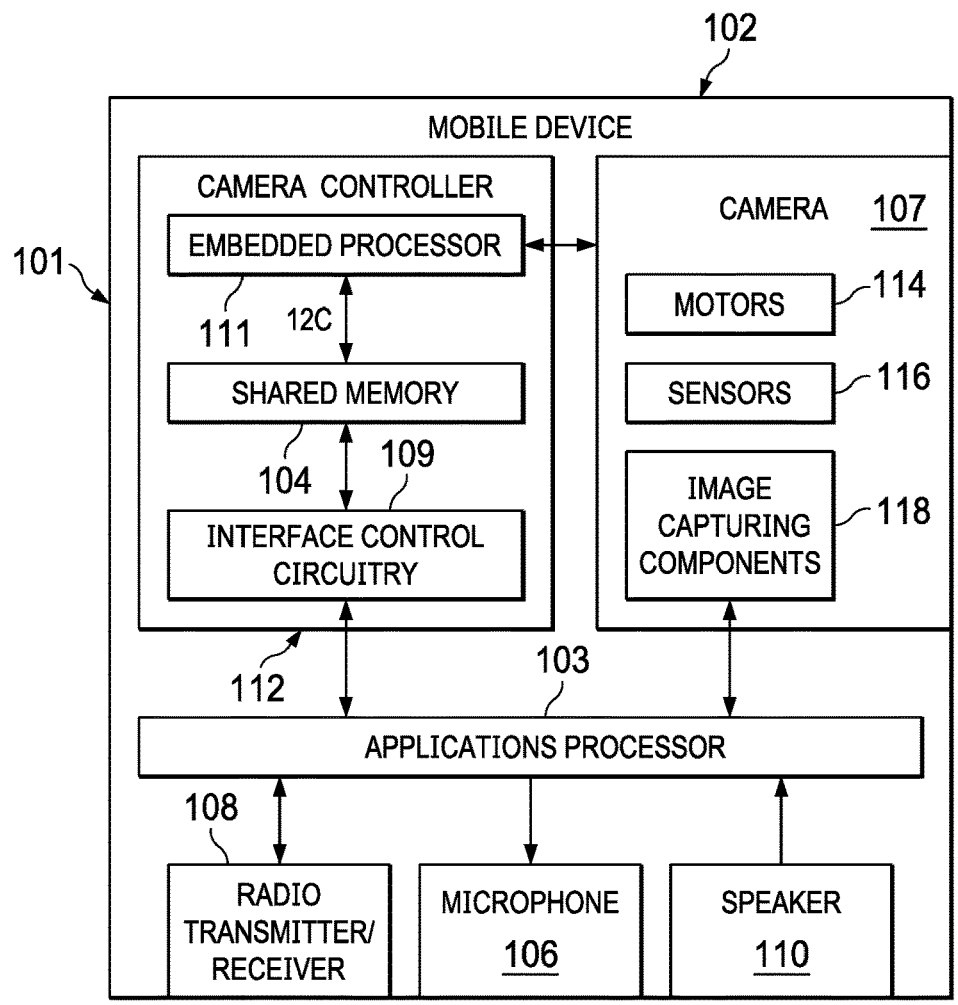
FIG. 1 illustrates a block diagram of selected components of an example mobile device, in accordance with embodiments of the present disclosure.

FIG. 1 illustrates a block diagram of selected components of an example mobile device 102, in accordance with embodiments of the present disclosure. As shown in FIG. 1, mobile device 102 may comprise an enclosure 101, an applications processor 103, a microphone 106, a camera 107, a radio transmitter/receiver 108, a speaker 110, and a camera controller 112.

Enclosure 101 may comprise any suitable housing, casing, or other enclosure for housing the various components of mobile device 102. Enclosure 101 may be constructed from plastic, metal, and/or any other suitable materials. In addition, enclosure 101 may be adapted (e.g., sized and shaped) such that mobile device 102 is readily transported on a person of a user of mobile device 102. Accordingly, mobile device 102 may include but is not limited to a smart phone, a tablet computing device, a handheld computing device, a personal digital assistant, a notebook computer, a video game controller, or any other device that may be readily transported on a person of a user of mobile device 102.

Applications processor 103 may be housed within enclosure 101 and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (not explicitly shown) and/or other computer-readable media accessible to applications processor 103.

Microphone 106 may be housed at least partially within enclosure 101, may be communicatively coupled to applications processor 103, and may comprise any system, device, or apparatus configured to convert sound incident at microphone 106 to an electrical signal that may be processed by applications processor 103, wherein such sound is converted to an electrical signal using a diaphragm or membrane having an electrical capacitance that varies based on sonic vibrations received at the diaphragm or membrane. Microphone 106 may include an electrostatic microphone, a condenser microphone, an electret microphone, a microelectromechanical systems (MEMs) microphone, or any other suitable capacitive microphone.

Radio transmitter/receiver 108 may be housed within enclosure 101, may be communicatively coupled to applications processor 103, and may include any system, device, or apparatus configured to, with the aid of an antenna, generate and transmit radio-frequency signals as well as receive radio-frequency signals and convert the information carried by such received signals into a form usable by applications processor 103. Radio transmitter/receiver 108 may be configured to transmit and/or receive various types of radio-frequency signals, including without limitation, cellular communications (e.g., 2G, 3G, 4G, LTE, etc.), short-range wireless communications (e.g., BLUETOOTH), commercial radio signals, television signals, satellite radio signals (e.g., GPS), Wireless Fidelity, etc.

A speaker 110 may be housed at least partially within enclosure 101 or may be external to enclosure 101, may be communicatively coupled to applications processor 103, and may comprise any system, device, or apparatus configured to produce sound in response to electrical audio signal input. In some embodiments, a speaker may comprise a dynamic loudspeaker, which employs a lightweight diaphragm mechanically coupled to a rigid frame via a flexible suspension that constrains a voice coil to move axially through a magnetic gap. When an electrical signal is applied to the voice coil, a magnetic field is created by the electric current in the voice coil, making it a variable electromagnet. The voice coil and the driver's magnetic system interact, generating a mechanical force that causes the voice coil (and thus, the attached cone) to move back and forth, thereby reproducing sound under the control of the applied electrical signal coming from the amplifier.

Camera 107 may be housed at least partially within enclosure 101 (and partially outside of enclosure 101, to enable light to enter a lens of camera 107), and may include any suitable system, device, or apparatus for recording images (moving or still) into one or more electrical signals that may be processed by applications processor 103. As shown in FIG. 1, camera 107 may include a plurality of motors 114, sensors 116, and image capturing components 118.

Image capturing components 118 may include a collection of components configured to capture an image, including without limitation one or more lenses and image sensors for sensing intensities and wavelengths of received light. Such image capturing components 118 may be coupled to applications processor 103 such that camera 107 may communicate captured images to applications processor 103.

Motors 114 may be mechanically coupled to one or more of image capturing components 118, and each motor 114 may include any suitable system, device, or apparatus configured to, based on control signals received from camera controller 112 indicative of a desired camera position, drive mechanical motion of such one or more image capturing components to such desired camera position.

Sensors 116 may be mechanically coupled to one or more of image capturing components 118 and/or motors 114 and may be configured to sense a position associated with camera 107. For example, a first sensor 116 may sense a first position (e.g., x-position) of camera 107 with respect to a first linear direction, a second sensor 116 may sense a second position (e.g., y-position) of camera 107 with respect to a second linear direction normal to the first linear direction, and a third sensor 116 may sense a third position (e.g., z-position) of camera 107 (e.g., position of lens) with respect to a third linear direction normal to the first linear direction and the second linear direction.

Camera controller 112 may be housed within enclosure 101, may be communicatively coupled to camera 107 and applications processor 103 (e.g., via an Inter-Integrated Circuit (I2C) interface), and may include any system, device, or apparatus configured to control motors 114 or other components of camera 107 to place components of camera 107 into a desired position. Camera controller 112 may also be configured to receive signals from sensors 116 regarding an actual position of camera 107 and/or regarding a status of camera 107. As shown in FIG. 1, camera controller 112 may include an embedded processor 111, interface control circuitry 109, and a shared memory 104 communicatively coupled to each of interface control circuitry 109 and embedded processor 111.

Embedded processor 111 may be integral to camera controller 112, and may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, applications processor 103 may interpret and/or execute program instructions and/or process data stored in a memory (e.g., shared memory or other memory) and/or other computer-readable media accessible to embedded processor 111. Specifically, embedded processor 111 may be configured to perform functionality of camera controller 112, including but not limited to control and management of shared memory 104, control of motors 114, and receipt and processing of data from sensors 116.

Shared memory 104 may be integral to camera controller 112, may be coupled to each of interface control circuitry 109 and embedded processor 111. Shared memory 104 may include any system, device, or apparatus configured to retain program instructions and/or data for a period of time (e.g., computer-readable media). Shared memory 104 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to mobile device 102 is turned off.

Interface control circuitry 109 may comprise any suitable system, device, or apparatus configured to serve as a communication interface between applications processor 103 and shared memory 104 and/or control a plurality of buffers 202 of shared memory 104 (see FIG. 2) as described in greater detail below.

Figure 2:
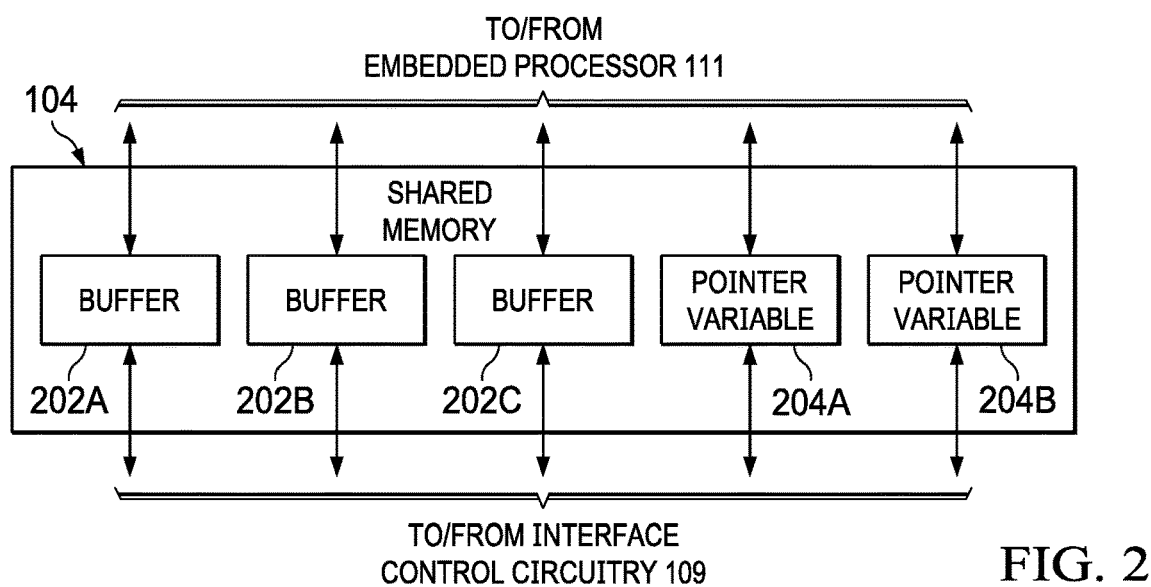
FIG. 2 illustrates a block diagram of selected components of an example shared memory, in accordance with embodiments of the present disclosure.

FIG. 2 illustrates a block diagram of selected components of an example shared memory 104, in accordance with embodiments of the present disclosure. As shown in FIG. 2, shared memory 104 may include a plurality of at least three memory buffers 202A, 202B, and 202C (which may be referred to individually as a "memory buffer 202" and collectively as "memory buffers 202"), and a plurality of pointer variables 204A and 204B (e.g., which may each be embodied by a portion of shared memory 104).

Each memory buffer 202 may be configured to store a vector of data. A vector of data may include position and/or status information related to camera 107 communicated to shared memory 104 by camera 107. Pointer variable 204A may define a most-recently updated buffer of the plurality of buffers 202 to which information has been fully written by embedded processor 111. Pointer variable 204B may define an active buffer 202 of the plurality of buffers 202 from which applications processor 103 may be actively receiving information via interface control circuitry 109. Thus, camera controller 112 may be configured to maintain a first variable (pointer variable 204B) that defines an active buffer 202 of the plurality of buffers 202 from which a receiver (e.g., applications processor 103) is receiving information and may also maintain a second variable (pointer variable 204A) that defines the most-recently updated buffer 202 of the plurality of buffers 202 to which information has been fully written by the transmitter (e.g., camera 107).

Although FIG. 2 depicts shared memory 104 having three buffers 202, shared memory 104 may have any suitable number of three or more buffers 202.

In operation, camera controller 112 (e.g., via interface control circuitry 109 and/or embedded processor 111) may be configured to, responsive to a condition for transferring information represented by the vectors of data to application processor 103 (e.g., responsive to a "read" command from application processor 103 to read vector data), determine which of the plurality of buffers 202 from which applications processor 103 may receive most-recently updated information completely written to the plurality of buffers 202 by embedded processor 111. Such buffer 202 may be the buffer 202 defined as the most-recently updated buffer of the plurality of buffers 202 as defined by pointer variable 204A. Furthermore, in operation, responsive to a condition for updating information represented by the vectors of data, camera controller 112 (e.g., via interface control circuitry 109 and/or embedded processor 111) may be configured to determine to which of the plurality of buffers 202 for embedded processor 111 to write updated information without blocking atomic receipt by applications processor 103 of information from the most-recently updated buffer 202 as defined by pointer variable 204A. For example, responsive to the condition for updating information represented by the vectors of data, camera controller 112 (e.g., via interface control circuitry 109 and/or embedded processor 111) may select a selected buffer 202 from the plurality of buffers 202 other than the active buffer (if any) defined by pointer variable 204B and other than the most-recently updated buffer for the transmitter to write updated information as defined by pointer variable 204A.

In addition, camera controller 112 (e.g., via interface control circuitry 109 and/or embedded processor 111) may be further configured to, responsive to completion of writing updated information by embedded processor 111 to the selected buffer 202, modify pointer variable 204A to define the selected buffer 202 as the most-recently updated buffer 202.

Moreover, camera controller 112 (e.g., via interface control circuitry 109 and/or embedded processor 111) may be further configured to, responsive to a condition for transferring information represented by the vectors of data to application processor 103 (e.g., responsive to a "read" command from application processor 103 to read vector data), cause application processor 103 to receive information from the most-recently updated buffer 202 as defined by pointer variable 204A and, substantially contemporaneously to causing application processor 103 to receive information from the most-recently updated buffer 202 as defined by pointer variable 204A, modify pointer variable 204B to re-define the most-recently updated buffer 202 as the active buffer 202.

Further discussion of the functionality of camera controller 112 is set forth in FIGS. 3 and 4 below, and the descriptions thereof.

Figure 3:
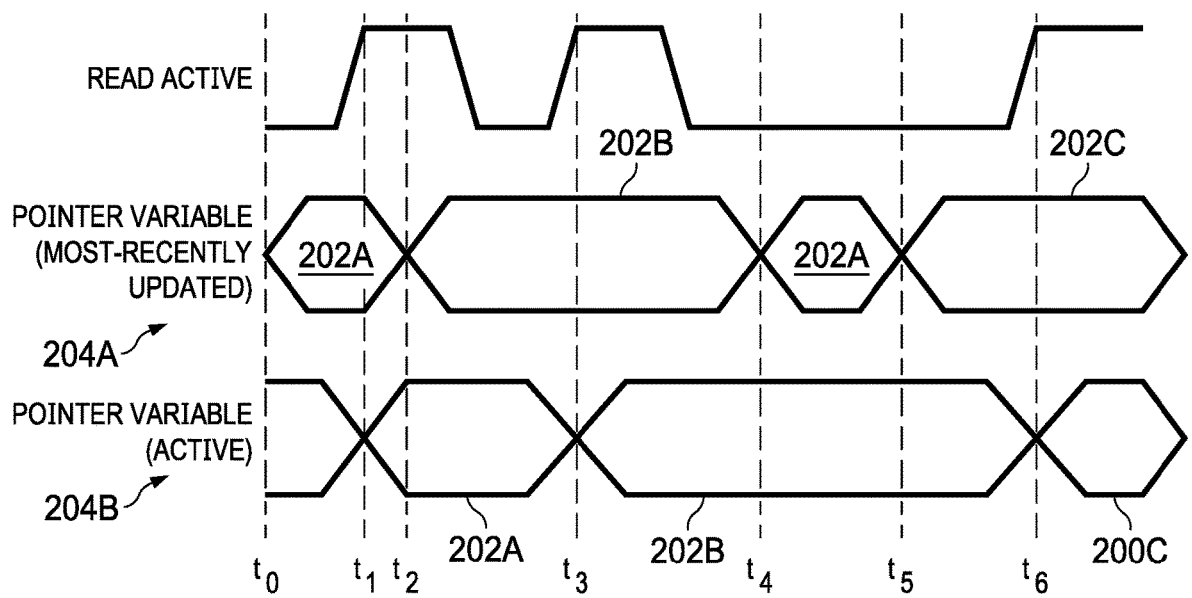
FIG. 3 illustrates a timing diagram depicting an example time progression of pointer variables, in accordance with embodiments of the present disclosure.

FIG. 3 illustrates a timing diagram depicting an example time progression of pointer variables 204A and 204B, in accordance with embodiments of the present disclosure. FIG. 4 illustrates a timing diagram depicting example selection of a free buffer 202, filling of a buffer 202 with data written from embedded processor 111, and reading of the data by an application processor 103, in accordance with embodiments of the present disclosure.

Figure 4:
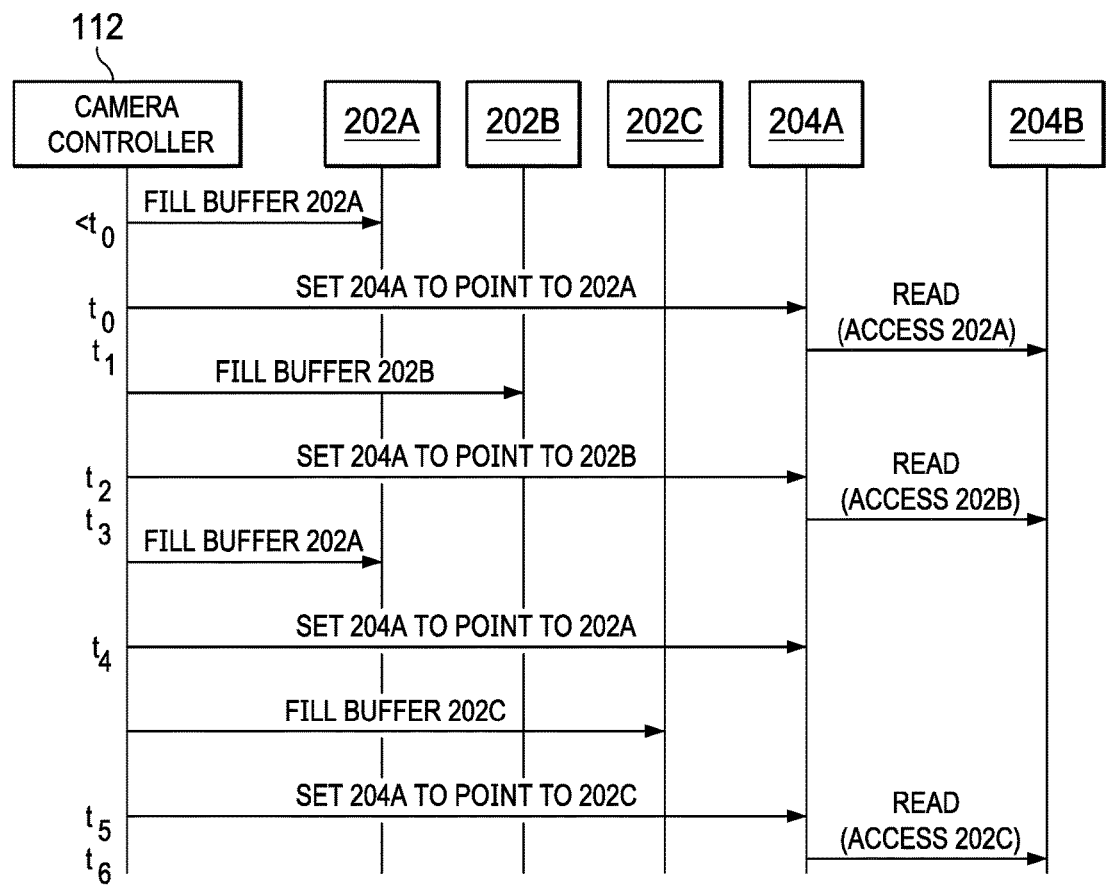
FIG. 4 illustrates a timing diagram depicting example selection of a free buffer, filling of a buffer with data written from a camera controller, and reading of the data by an application processor, in accordance with embodiments of the present disclosure.

As shown in FIGS. 3 and 4, at some time before a time to, all buffers 202 may be free, and camera controller 112 may fill buffer 202A with vector data. At time to, after completion of the writing to buffer 202A with the vector data, camera controller 112 (e.g., via interface control circuitry 109 and/or embedded processor 111) may set pointer variable 204A to designate buffer 202A as the buffer which should be read responsive to a read command from applications processor 103.

At a time $t_1$, a read command from applications processor 103 may occur, and interface control circuitry 109 may cause the data in buffer 202A as designated by pointer variable 204A to be read by applications processor 103, and may also set pointer variable 204B to designate buffer 202A as the active buffer from which data is being read.

If an additional data vector is written by embedded processor 111 during the time applications processor 103 is actively receiving data, camera controller 112 (e.g., via interface control circuitry 109 and/or embedded processor 111) may cause data to be written to a buffer 202 (e.g., buffer 202B) other than the active buffer 202A and the buffer 202 (if any) pointed to by pointer variable 204A. At time $t_2$, after completion of the writing to buffer 202B with the vector data, camera controller 112 (e.g., via interface control circuitry 109 and/or embedded processor 111) may set pointer variable 204A to designate buffer 202B as the buffer which should be read responsive to a read command from applications processor 103.

At a time $t_3$, a read command from applications processor 103 may occur, and camera controller 112 (e.g., via interface control circuitry 109 and/or embedded processor 111) may cause the data in buffer 202B as designated by pointer variable 204A to be read by applications processor 103, and may also set pointer variable 204B to designate buffer 202B as the active buffer from which data is being read.

At a time after time $t_3$, if an additional data vector is written by embedded processor 111 during the time applications processor 103 is actively receiving data, camera controller 112 (e.g., via interface control circuitry 109 and/or embedded processor 111) may cause data to be written to a buffer 202 (e.g., buffer 202A) other than the active buffer 202B and the buffer 202 (if any) pointed to by pointer variable 204A. At a time Li, after data is written to buffer 202A, camera controller 112 (e.g., via interface control circuitry 109 and/or embedded processor 111) may set pointer variable 204A to designate buffer 202A as the buffer which should be read responsive to a read command from applications processor 103.

At a time after time $t_4$, embedded processor 111 may again write data, and camera controller 112 may cause data to be written to a buffer 202 (e.g., buffer 202C) other than the active buffer 202B designated by pointer variable 204A and the most-recently updated buffer 202A as designated by pointer variable 204B. At a time $t_6$, after data is written to buffer 202C, camera controller 112 may set pointer variable 204A to designate buffer 202C as the buffer which should be read responsive to a read command from applications processor 103. Accordingly, embedded processor 111 may write to buffers 202 asynchronously, and not every write to buffers 202 may be read by applications processor 103 (e.g., such as the write to buffer 202A occurring immediately before time $t_4$).

At a time $t_6$, a read command from applications processor 103 may occur, and camera controller 112 (e.g., via interface control circuitry 109 and/or embedded processor 111) may cause the data in buffer 202C as designated by pointer variable 204A to be read by applications processor 103, and may also set pointer variable 204B to designate buffer 202C as the active buffer from which data is being read. In addition, use of three (or more) buffers 202 may ensure that camera controller 112 will be able to write to a buffer 202 that is not already in use. Furthermore, the architecture described herein may allow application processor 103 to perform asynchronous reads of the most recently written vector.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system for atomically transferring vectors of data from a transmitter of the vectors of data to a receiver of the vectors of data, comprising:
    a plurality of memory buffers configured to store the vectors of the data, each buffer configured to store one vector of the vectors of data at a time, the plurality of memory buffers comprising at least three memory buffers; and
    a controller for controlling the plurality of memory buffers, the controller configured to:
        responsive to a condition for transferring information represented by the vectors of data to the receiver, determine which of the plurality of buffers from which the receiver may receive most-recently updated information completely written to the plurality of buffers by the transmitter; and
        responsive to a condition for updating information represented by the vectors of data, determine which of the plurality of buffers for the transmitter to write updated information without blocking atomic receipt by the receiver of information from a most-recently updated buffer.

2. The system of claim 1, wherein the controller is further configured to:
    maintain a first variable that defines an active buffer of the plurality of buffers from which the receiver is receiving information; and
    maintain a second variable that defines the most-recently updated buffer of the plurality of buffers to which information has been fully written by the transmitter.

3. The system of claim 2, wherein the controller is configured to, responsive to the condition for updating information represented by the vectors of data, select a selected buffer from the plurality of buffers other than the active buffer and other than the most-recently updated buffer for the transmitter to write updated information.

4. The system of claim 3, wherein the controller is configured to, responsive to completion of writing updated information to the selected buffer, modify the second variable to define the selected buffer as the most-recently updated buffer.

5. The system of claim 2, wherein the controller is configured to, responsive to the condition for transferring information represented by the vectors of data to the receiver:
    cause the receiver to receive information from the most-recently updated buffer as defined by the second variable; and
    substantially contemporaneously with causing the receiver to receive information from the most-recently updated buffer as defined by the second variable, modify the first variable to re-define the most-recently updated buffer as the active buffer.

6. The system of claim 1, wherein the controller comprises a camera controller for controlling one or more components of a camera.

7. The system of claim 6, further wherein:
    the receiver comprises an applications processor of a mobile device; and
    the transmitter comprises a camera of the mobile device.

8. A method for atomically transferring vectors of data from a transmitter of the vectors of data to a receiver of the vectors of data, comprising:
    storing the vectors of data in a plurality of memory buffers, each buffer configured to store one vector of the vectors of data at a time, the plurality of memory buffers comprising at least three memory buffers;
    responsive to a condition for transferring information represented by the vectors of data to the receiver, determining which of the plurality of buffers from which the receiver may receive most-recently updated information completely written to the plurality of buffers by the transmitter; and
    responsive to a condition for updating information represented by the vectors of data, determining which of the plurality of buffers for the transmitter to write updated information without blocking atomic receipt by the receiver of information from a most-recently updated buffer.

9. The method of claim 8, further comprising:
    maintaining a first variable that defines an active buffer of the plurality of buffers from which the receiver is receiving information; and
    maintaining a second variable that defines the most-recently updated buffer of the plurality of buffers to which information has been fully written by the transmitter.

10. The method of claim 9, further comprising, responsive to the condition for updating information represented by the vectors of data, selecting a selected buffer from the plurality of buffers other than the active buffer and other than the most-recently updated buffer for the transmitter to write updated information.

11. The method of claim 10, further comprising, responsive to completion of writing updated information to the selected buffer, modifying the second variable to define the selected buffer as the most-recently updated buffer.

12. The method of claim 9, further comprising, responsive to the condition for transferring information represented by the vectors of data to the receiver:
    causing the receiver to receive information from the most-recently updated buffer as defined by the second variable; and
    substantially contemporaneously with causing the receiver to receive information from the most-recently updated buffer as defined by the second variable, modifying the first variable to re-define the most-recently updated buffer as the active buffer.

13. The method of claim 12, further wherein:
    the receiver comprises an applications processor of a mobile device; and
    the transmitter comprises a camera of the mobile device.

14. A system comprising:
    a transmitter for transmitting of vectors of data;
    a receiver for receiving vectors of data;
    a plurality of memory buffers configured to store the vectors of the data, each buffer configured to store one vector of the vectors of data at a time, the plurality of memory buffers comprising at least three memory buffers; and a controller for controlling the plurality of memory buffers and atomically transferring vectors of data from a transmitter of the vectors of data to a receiver of the vectors of data, the controller configured to:

responsive to a condition for transferring information represented by the vectors of data to the receiver, determine which of the plurality of buffers from which the receiver may receive most-recently updated information completely written to the plurality of buffers by the transmitter; and responsive to a condition for updating information represented by the vectors of data, determine which of the plurality of buffers for the transmitter to write updated information without blocking atomic receipt by the receiver of information from a most-recently updated buffer.

15. The system of claim 14, wherein the controller is further configured to:

maintain a first variable that defines an active buffer of the plurality of buffers from which the receiver is receiving information; and maintain a second variable that defines the most-recently updated buffer of the plurality of buffers to which information has been fully written by the transmitter.

16. The system of claim 15, wherein the controller is configured to, responsive to the condition for updating information represented by the vectors of data, select a selected buffer from the plurality of buffers other than the active buffer and other than the most-recently updated buffer for the transmitter to write updated information.

17. The system of claim 16, wherein the controller is configured to, responsive to completion of writing updated information to the selected buffer, modify the second variable to define the selected buffer as the most-recently updated buffer.

18. The system of claim 15, wherein the controller is configured to, responsive to the condition for transferring information represented by the vectors of data to the receiver:

cause the receiver to receive information from the most-recently updated buffer as defined by the second variable; and substantially contemporaneously with causing the receiver to receive information from the most-recently updated buffer as defined by the second variable, modify the first variable to re-define the most-recently updated buffer as the active buffer.

19. The system of claim 14, wherein the controller comprises a camera controller for controlling one or more components of a camera.

20. The system of claim 19, further wherein:

the receiver comprises an applications processor of a mobile device; and the transmitter comprises a camera of the mobile device.

* * * * *